United States Patent
Andrews et al.

(10) Patent No.: US 10,067,567 B2
(45) Date of Patent: Sep. 4, 2018

(54) MULTI-DIMENSIONAL TRACKPAD

(71) Applicants: TK Holdings, Inc., Auburn Hills, MI (US); NextInput, Atlanta, GA (US)

(72) Inventors: David Andrews, Ortonville, MI (US); Ian Campbell, Smyrna, GA (US); Ryan Diestelhorst, Atlanta, GA (US); Jason Carl Lisseman, Shelby Township, MI (US); Don Metzger, Heber City, UT (US)

(73) Assignees: JOYSON SAFETY SYSTEMS ACQUISTION LLC, Auburn Hills, MI (US); NextInput, Inc., Atlanta, GA (US)

( * ) Notice: Subject to any disclaimer, the term of this patent is extended or adjusted under 35 U.S.C. 154(b) by 0 days.

(21) Appl. No.: 14/291,845

(22) Filed: May 30, 2014

(65) Prior Publication Data
US 2014/0354568 A1    Dec. 4, 2014

Related U.S. Application Data

(60) Provisional application No. 61/829,065, filed on May 30, 2013.

(51) Int. Cl.
*G06F 3/0354* (2013.01)
*G06F 3/01* (2006.01)
(Continued)

(52) U.S. Cl.
CPC ............ *G06F 3/016* (2013.01); *B60K 35/00* (2013.01); *B60K 37/06* (2013.01); *B60R 16/023* (2013.01);
(Continued)

(58) Field of Classification Search
CPC ... G09G 5/00; H02N 2/04; H04B 3/36; G06F 7/00; G06F 3/033; G06F 3/041;
(Continued)

(56) References Cited

U.S. PATENT DOCUMENTS

| 4,484,026 A | 11/1984 | Thornburg |
| 4,540,979 A | 9/1985 | Gerger et al. |

(Continued)

FOREIGN PATENT DOCUMENTS

| EP | 1607850 A2 | 12/2005 |
| JP | 64-66522 | 3/1989 |

(Continued)

OTHER PUBLICATIONS

International Search Report and Written Opinion issued in related International Application No. PCT/US2014/059652 on Dec. 22, 2014.

(Continued)

*Primary Examiner* — Abdul-Samad A Adediran
(74) *Attorney, Agent, or Firm* — Meunier Carlin & Curfman LLC

(57) ABSTRACT

A multi-dimensional track pad is described that acts as human-machine interface (HMI). Inputs to the HMI can be made not only using the tradition two-dimensional (X-Y) inputs of a track pad, but also a third dimension, force, and even a fourth dimension, time. Tactile or audible feedback to the inputs can be provided. Methods of using the HMI to control a system are described as well as a track pad system that utilizes the HMI in communication with a processor.

27 Claims, 5 Drawing Sheets

(51) Int. Cl.
*B60K 35/00* (2006.01)
*G06F 3/041* (2006.01)
*B60R 16/023* (2006.01)
*B60W 50/16* (2012.01)
*G06F 3/16* (2006.01)
*B60K 37/06* (2006.01)

(52) U.S. Cl.
CPC ......... *B60W 50/16* (2013.01); *G06F 3/03547* (2013.01); *G06F 3/0414* (2013.01); *G06F 3/16* (2013.01); *B60K 2350/1036* (2013.01); *B60K 2350/1052* (2013.01); *B60K 2350/928* (2013.01)

(58) Field of Classification Search
CPC . G06F 3/048; G06F 3/02; G06F 3/044; G06F 3/0414; B60W 50/08; B60W 10/00; H03K 17/94; G08B 6/00; B60K 37/06
USPC ............ 310/331; 340/407.1, 384.6; 345/156, 345/168, 173; 701/48
See application file for complete search history.

(56) References Cited

U.S. PATENT DOCUMENTS

| | | | |
|---|---|---|---|
| 4,801,771 A | 1/1989 | Mizuguchi et al. | |
| 4,929,934 A | 5/1990 | Ueda et al. | |
| 5,398,962 A | 3/1995 | Kropp | |
| 5,408,873 A | 4/1995 | Schmidt et al. | |
| 5,423,569 A | 6/1995 | Reighard et al. | |
| 5,453,941 A | 9/1995 | Yoshikawa | |
| 5,463,258 A | 10/1995 | Filion et al. | |
| 5,539,259 A | 7/1996 | Filion et al. | |
| 5,793,297 A | 8/1998 | Takeuchi et al. | |
| 5,871,063 A | 2/1999 | Young | |
| 5,914,658 A | 6/1999 | Arakawa | |
| 5,943,044 A | 8/1999 | Martinelli | |
| 5,965,952 A | 10/1999 | Podoloff et al. | |
| 6,067,077 A | 5/2000 | Martin | |
| 6,333,736 B1 | 12/2001 | Sandbach | |
| 6,378,384 B1 | 4/2002 | Atkinson et al. | |
| 6,429,846 B2 | 8/2002 | Rosenberg et al. | |
| 6,501,463 B1 | 12/2002 | Dahley et al. | |
| 6,636,197 B1 | 10/2003 | Goldenberg et al. | |
| 6,809,462 B2 | 10/2004 | Pelrine et al. | |
| 6,906,700 B1 | 6/2005 | Armstrong | |
| 6,933,920 B2 | 8/2005 | Lacroix et al. | |
| 7,126,583 B1 | 10/2006 | Breed | |
| 7,136,051 B2 | 11/2006 | Hein et al. | |
| 7,258,026 B2 | 8/2007 | Papakostas et al. | |
| 7,649,278 B2 | 1/2010 | Yoshida et al. | |
| 8,052,293 B2 | 11/2011 | Hurwitz | |
| 8,203,454 B2 | 6/2012 | Knight et al. | |
| 8,214,105 B2 | 7/2012 | Daly et al. | |
| 8,222,799 B2 | 7/2012 | Polyakov et al. | |
| 8,237,324 B2 | 8/2012 | Pei et al. | |
| 8,269,731 B2 | 9/2012 | Molne | |
| 8,633,916 B2 | 1/2014 | Bernstein | |
| 8,698,764 B1* | 4/2014 | Karakotsios | G06F 1/1692 345/173 |
| 9,007,190 B2 | 4/2015 | Bosch et al. | |
| 9,244,562 B1 | 1/2016 | Rosenberg | |
| 9,696,223 B2 | 7/2017 | Lisseman et al. | |
| 9,727,031 B2 | 8/2017 | Lisseman et al. | |
| 2002/0041164 A1 | 4/2002 | Kim | |
| 2002/0054060 A1 | 5/2002 | Schena | |
| 2003/0043014 A1 | 3/2003 | Nakazawa et al. | |
| 2003/0076968 A1 | 4/2003 | Rast | |
| 2003/0083131 A1 | 5/2003 | Armstrong | |
| 2004/0195031 A1 | 10/2004 | Nagasaka | |
| 2004/0207605 A1 | 10/2004 | Mackey et al. | |
| 2005/0021190 A1 | 1/2005 | Worrell et al. | |
| 2005/0052426 A1 | 3/2005 | Hagermoser et al. | |
| 2005/0067889 A1 | 3/2005 | Chernoff | |
| 2005/0110769 A1 | 5/2005 | Dacosta et al. | |
| 2005/0156892 A1 | 7/2005 | Grant et al. | |
| 2005/0273218 A1 | 12/2005 | Breed et al. | |
| 2006/0025897 A1 | 2/2006 | Shostak et al. | |
| 2006/0054479 A1 | 3/2006 | Iisaka | |
| 2006/0076855 A1 | 4/2006 | Eriksen et al. | |
| 2006/0109256 A1* | 5/2006 | Grant | G06F 3/016 345/173 |
| 2006/0113880 A1 | 6/2006 | Pei et al. | |
| 2006/0177212 A1 | 8/2006 | Lamborghini et al. | |
| 2006/0248478 A1 | 11/2006 | Liau | |
| 2006/0262103 A1* | 11/2006 | Hu | G06F 3/023 345/173 |
| 2006/0284839 A1* | 12/2006 | Breed | B62D 1/046 345/156 |
| 2007/0062753 A1 | 3/2007 | Yoshida et al. | |
| 2007/0097073 A1 | 5/2007 | Takashima et al. | |
| 2007/0100523 A1 | 5/2007 | Trachte | |
| 2007/0287494 A1 | 12/2007 | You et al. | |
| 2008/0012837 A1 | 1/2008 | Marriott et al. | |
| 2008/0062145 A1 | 3/2008 | Shahoian | |
| 2008/0079604 A1 | 4/2008 | Madonna et al. | |
| 2008/0150911 A1 | 6/2008 | Harrison | |
| 2008/0202912 A1 | 8/2008 | Boddie et al. | |
| 2008/0230283 A1 | 9/2008 | Yoon | |
| 2008/0264183 A1 | 10/2008 | Graham et al. | |
| 2008/0289887 A1 | 11/2008 | Flint et al. | |
| 2009/0001855 A1* | 1/2009 | Lipton | G06F 3/016 310/331 |
| 2009/0125811 A1 | 5/2009 | Bethurum | |
| 2009/0140994 A1 | 6/2009 | Tanaka et al. | |
| 2009/0140996 A1 | 6/2009 | Takashima et al. | |
| 2009/0151447 A1 | 6/2009 | Jin et al. | |
| 2009/0153340 A1 | 6/2009 | Pinder et al. | |
| 2009/0160529 A1 | 6/2009 | Lamborghini | |
| 2009/0189749 A1 | 7/2009 | Salada | |
| 2009/0228791 A1 | 9/2009 | Kim et al. | |
| 2009/0241378 A1 | 10/2009 | Ellis | |
| 2010/0001974 A1 | 1/2010 | Su et al. | |
| 2010/0045612 A1 | 2/2010 | Molne | |
| 2010/0053087 A1* | 3/2010 | Dai | G06F 3/016 345/168 |
| 2010/0066512 A1 | 3/2010 | Rank | |
| 2010/0141606 A1 | 6/2010 | Bae | |
| 2010/0168998 A1 | 7/2010 | Matsunaga | |
| 2010/0200375 A1 | 8/2010 | Han et al. | |
| 2010/0226075 A1 | 9/2010 | Jahge | |
| 2010/0236911 A1 | 9/2010 | Kim et al. | |
| 2010/0250066 A1 | 9/2010 | Eckstein et al. | |
| 2010/0250071 A1* | 9/2010 | Pala | B60K 35/00 701/48 |
| 2010/0268426 A1* | 10/2010 | Pathak | G06F 3/03547 701/48 |
| 2010/0302177 A1 | 12/2010 | Kim et al. | |
| 2010/0315267 A1 | 12/2010 | Chung et al. | |
| 2010/0321310 A1 | 12/2010 | Kim et al. | |
| 2010/0321335 A1 | 12/2010 | Lim et al. | |
| 2011/0037721 A1 | 2/2011 | Cranfill et al. | |
| 2011/0046788 A1 | 2/2011 | Daly et al. | |
| 2011/0054359 A1 | 3/2011 | Sazonov et al. | |
| 2011/0069021 A1 | 3/2011 | Hill | |
| 2011/0109552 A1 | 5/2011 | Yasutake | |
| 2011/0141052 A1 | 6/2011 | Bernstein et al. | |
| 2011/0148608 A1 | 6/2011 | Grant | |
| 2011/0175844 A1 | 7/2011 | Berggren | |
| 2011/0205081 A1 | 8/2011 | Chen | |
| 2011/0210926 A1 | 9/2011 | Pasquero et al. | |
| 2011/0216015 A1 | 9/2011 | Edwards | |
| 2011/0227872 A1 | 9/2011 | Huska | |
| 2011/0241850 A1* | 10/2011 | Bosch | B60K 37/06 340/384.6 |
| 2011/0245992 A1 | 10/2011 | Stahlin et al. | |
| 2011/0248728 A1 | 10/2011 | Maruyama et al. | |
| 2011/0255023 A1 | 10/2011 | Doyle et al. | |
| 2011/0260983 A1 | 10/2011 | Pertuit et al. | |
| 2011/0267181 A1 | 11/2011 | Kildal | |
| 2011/0279380 A1 | 11/2011 | Weber et al. | |
| 2011/0290038 A1 | 12/2011 | Hoshino et al. | |

(56) References Cited

U.S. PATENT DOCUMENTS

| | | |
|---|---|---|
| 2012/0013573 A1 | 1/2012 | Liu et al. |
| 2012/0038468 A1* | 2/2012 | Provancher ............ G06F 3/0338 340/407.1 |
| 2012/0039494 A1 | 2/2012 | Ellis |
| 2012/0105367 A1 | 5/2012 | Son et al. |
| 2012/0120009 A1 | 5/2012 | Lussey et al. |
| 2012/0126959 A1 | 5/2012 | Zarrabi et al. |
| 2012/0127115 A1 | 5/2012 | Gannon |
| 2012/0169663 A1 | 7/2012 | Kim et al. |
| 2012/0223900 A1 | 9/2012 | Jiyama |
| 2012/0229424 A1 | 9/2012 | Behles |
| 2012/0267221 A1 | 10/2012 | Gohng et al. |
| 2012/0267222 A1 | 10/2012 | Gohng et al. |
| 2012/0296528 A1 | 11/2012 | Wellhoefer et al. |
| 2012/0299856 A1 | 11/2012 | Hasui |
| 2013/0016053 A1 | 1/2013 | Jung et al. |
| 2013/0063380 A1 | 3/2013 | Wang et al. |
| 2013/0063389 A1 | 3/2013 | Moore et al. |
| 2013/0093679 A1 | 4/2013 | Dickinson et al. |
| 2013/0096849 A1 | 4/2013 | Campbell et al. |
| 2013/0106691 A1 | 5/2013 | Rank |
| 2013/0113715 A1 | 5/2013 | Grant et al. |
| 2013/0113717 A1 | 5/2013 | Van Eerd et al. |
| 2013/0122857 A1 | 5/2013 | Karaogu et al. |
| 2013/0128587 A1 | 5/2013 | Lisseman et al. |
| 2013/0141396 A1 | 6/2013 | Lynn et al. |
| 2013/0147284 A1 | 6/2013 | Chun |
| 2013/0154938 A1 | 6/2013 | Arthur et al. |
| 2013/0181931 A1 | 7/2013 | Kinoshita |
| 2013/0222287 A1 | 8/2013 | Bae et al. |
| 2013/0222310 A1 | 8/2013 | Birnbaum et al. |
| 2013/0228023 A1 | 9/2013 | Drasnin et al. |
| 2013/0250213 A1 | 9/2013 | Tomomasa |
| 2013/0250502 A1 | 9/2013 | Tossavainen |
| 2013/0250613 A1 | 9/2013 | Kamada |
| 2013/0307788 A1 | 11/2013 | Rao et al. |
| 2013/0342337 A1 | 12/2013 | Kiefer et al. |
| 2014/0092025 A1* | 4/2014 | Pala ....................... G06F 3/0414 345/173 |
| 2014/0114624 A1 | 4/2014 | Buchanan et al. |
| 2014/0191973 A1 | 7/2014 | Zellers |
| 2014/0267076 A1 | 9/2014 | Birnbaum et al. |
| 2014/0267113 A1 | 9/2014 | Lisseman et al. |
| 2014/0267114 A1 | 9/2014 | Lisseman et al. |
| 2014/0347176 A1 | 11/2014 | Phan et al. |
| 2015/0009168 A1 | 1/2015 | Olien et al. |
| 2015/0046825 A1 | 2/2015 | Li |
| 2015/0116205 A1 | 4/2015 | Westerman et al. |
| 2015/0212571 A1 | 7/2015 | Kitada et al. |
| 2015/0309576 A1 | 10/2015 | Tissot |
| 2016/0109949 A1 | 4/2016 | Park |
| 2016/0216764 A1 | 7/2016 | Morrell |
| 2017/0075424 A1 | 3/2017 | Bernstein |

FOREIGN PATENT DOCUMENTS

| | | |
|---|---|---|
| JP | 06-037056 U | 5/1994 |
| JP | 2005-175815 | 6/2005 |
| JP | 2006-129893 | 5/2006 |
| JP | 200071809 | 3/2007 |
| JP | 2008-181709 | 8/2008 |
| JP | 2009-008613 | 1/2009 |
| JP | 2009-521006 | 5/2009 |
| JP | 2009-186452 | 8/2009 |
| JP | 2009-244931 | 10/2009 |
| JP | 2010-511916 | 4/2010 |
| JP | 20113188 | 1/2011 |
| JP | 201273785 | 4/2012 |
| JP | 2012150833 | 8/2012 |
| JP | 2012176640 A | 9/2012 |
| JP | 2013513865 | 4/2013 |
| KR | 1020060047110 A | 5/2006 |
| KR | 10-2010-0129424 | 12/2010 |
| KR | 10-2011-0042924 | 4/2011 |
| WO | 0188935 | 11/2001 |
| WO | 2006123616 | 11/2006 |
| WO | 2011008292 A1 | 1/2011 |
| WO | 2011045929 | 4/2011 |
| WO | 2012052635 | 4/2012 |
| WO | 2013082293 A1 | 6/2013 |

OTHER PUBLICATIONS

International Search Report and Written Opinion issued in related International Application No. PCT/US2014/059673 on Jan. 9, 2015.

International Search Report and Written Opinion issued in related International Application No. PCT/2014/059669 on Jan. 23, 2015.

International Search Report and Written Opinion issued in related International Application No. PCT/US2014/059657 on Feb. 16, 2015.

International Search Report and Written Opinion issued in related International Application No. PCT/US2014/059639 on Feb. 24, 2015.

International Search Report and Written Opinion, dated Sep. 24, 2014, received in connection with International Application No. PCT/US2014/040224.

Office Action from United States Patent Office for U.S. Appl. No. 14/509,493, dated Sep. 30, 2015.

Office Action Dated Nov. 4, 2014, received in connection with JP Application No. 2011-075258. (English Translation attached).

Office Action dated Mar. 11, 2013 in U.S. Appl. No. 13/076,226, which issued as U.S. Pat. No. 9,007,190 on Apr. 14, 2015.

Office Action dated Feb. 13, 2014 in U.S. Appl. No. 13/076,226, which issued as U.S. Pat. No. 9,007,190 on Apr. 14, 2015.

Office Action dated Sep. 11, 2014 in U.S. Appl. No. 13/076,226, which issued as U.S. Pat. No. 9,007,190 on Apr. 14, 2015.

Office Action dated Jan. 21, 2016 in U.S. Appl. No. 13/673,463.

Office Action dated Feb. 18, 2015 in U.S. Appl. No. 13/673,463.

Office Action dated Aug. 20, 2015 in U.S. Appl. No. 13/673,463.

Co-pending U.S. Appl. No. 14/509,332, filed Oct. 8, 2014, and its file history.

Co-pending U.S. Appl. No. 14/509,598, filed Oct. 8, 2014, and its file history.

Co-pending U.S. Appl. No. 14/509,560, filed Oct. 8, 2014, and its file history.

Co-pending U.S. Appl. No. 14/509,535, filed Oct. 8, 2014, and its file history.

Co-pending U.S. Appl. No. 14/509,462, filed Oct. 8, 2014, and its file history.

Co-pending U.S. Appl. No. 13/673,463, filed Nov. 9, 2012, and its file history.

International Preliminary Report on Patentability in PCT Application No. PCT/US2014/040224, mailed Dec. 10, 2015.

Office Action mailed Sep. 30, 2015 in U.S. Appl. No. 14/509,493, filed Oct. 8, 2014.

Office Action issued in U.S. Appl. No. 14/509,332, dated Oct. 27, 2016.

Office Action issued in U.S. Appl. No. 14/509,462, dated Dec. 28, 2016.

Office Action issued in U.S. Appl. No. 14/509,493, dated Dec. 28, 2016.

Notice of Allowance issued in related U.S. Appl. No. 14/509,535 dated Aug. 3, 2016.

Non-Final Office Action issued in U.S. Appl. No. 14/509,535, dated Feb. 11, 2016.

Non-Final Office Action issued in U.S. Appl. No. 14/509,462 dated Jun. 14, 2016.

Non-Final Office Action issued in U.S. Appl. No. 14/509,493 dated Jun. 16, 2016.

Non-Final Office Action issued in U.S. Appl. No. 14/509,332, dated May 3, 2016.

International Preliminary Report on Patentability and Written Opinion, dated Apr. 12, 2016, received in connection with International Patent Application No. PCT/US2014/059639.

International Preliminary Report on Patentability and Written Opinion, dated Apr. 12, 2016, received in connection with International Patent Application No. PCT/US2014/059652.

(56) References Cited

OTHER PUBLICATIONS

International Preliminary Report on Patentability and Written Opinion, dated Apr. 12, 2016, received in connection with International Patent Application No. PCT/US2014/059657.
International Preliminary Report on Patentability and Written Opinion, dated Apr. 12, 2016, received in connection with International Patent Application No. PCT/US2014/059669.
International Preliminary Report on Patentability and Written Opinion, dated Apr. 12, 2016, received in connection with International Patent Application No. PCT/US2014/059673.
Non-Final Office Action issued in U.S. Appl. No. 14/509,560, dated Feb. 10, 2017.
Non Final Office Action issued in U.S. Appl. No. 15/230,786, dated Feb. 7, 2016.
Office Action issued in co-pending U.S. Appl. No. 14/509,462, dated Nov. 24, 2017.
Office Action issued in co-pending U.S. Appl. No. 15/230,786, dated Aug. 24, 2017.
Corrected Notice of Allowance issued in co-pending U.S. Appl. No. 14/509,560, dated Aug. 22, 2017.
Notice of Allowance issued in co-pending U.S. Appl. No. 14/509,493, dated Oct. 10, 2017.
International Search Report and Written Opinion for International Patent Application No. PCT/US2013/030417, dated Jun. 21, 2013.
Office Action issued in U.S. Appl. No. 14/211,475, dated Dec. 17, 2015.
Office Action issued in U.S. Appl. No. 14/211,665, dated Dec. 15, 2015.
Office Action issued in U.S. Appl. No. 14/028,798, dated Apr. 21, 2016.
Office Action issued in U.S. Appl. No. 14/028,798, dated Oct. 8, 2015.
Office Action issued in U.S. Appl. No. 14/028,798, dated Oct. 21, 2016.
Notice of Allowance issued in U.S. Appl. No. 14/028,798, dated Feb. 28, 2017.
Non-Final Office Action issued in U.S. Appl. No. 14/509,598, dated Jan. 6, 2017.
Non-Final Office Action issued in U.S. Appl. No. 14/509,462, dated Jun. 9, 2017.
Co-Pending U.S. Appl. No. 14/509,493, filed Oct. 8, 2014, and its file history.
Co-pending U.S. Appl. No. 13/863,363, filed Apr. 15, 2013.
Office Action issued in U.S. Appl. No. 13/863,363, dated Nov. 10, 2015.
Office Action issued in U.S. Appl. No. 13/863,363, dated Jun. 3. 2016.
Office Action issued in U.S. Appl. No. 13/863,363, dated Nov. 3, 2016.
Notice of Allowance issued in U.S. Appl. No. 13/863,363, dated Apr. 7, 2017.
Japanese Office Action, dated Jun. 19, 2018, in connection with Japanese Application No. 2016-517039.

* cited by examiner

| Force | System | Control Messages |
|---|---|---|
| First Threshold | HVAC | Turn on/off.<br>Adjust temperature.<br>Adjust fan speed.<br>Adjust mode (e.g., defrost, face and feet, just feet, etc.)<br>Adjust seat heat/ventilation.<br>Etc. |
| Second Threshold | Audio | Turn on/off.<br>Adjust sound level.<br>Adjust fade, balance, bass, treble, etc.<br>Adjust mode (e.g., radio, satellite radio, CD, auxiliary, etc.)<br>Etc. |
| Third Threshold | Windshield Wipers | Turn on/off.<br>Adjust speed/intermittent.<br>Spray/clean windows.<br>Turn on rear wipers (if equipped).<br>Etc. |
| Fourth Threshold | Cruise Control | Turn on/off.<br>Set speed.<br>Adjust speed.<br>Resume.<br>Etc. |
| Nth Threshold | Etc. | Etc. |

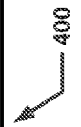

FIG. 4

MULTI-DIMENSIONAL TRACKPAD

CROSS REFERENCE TO RELATED APPLICATIONS

This application claims priority to U.S. Provisional Patent Application No. 61/829,065 filed May 30, 2013 and entitled "Three Dimensional Trackpad," the contents of which are herein incorporated by reference in its entirety.

BACKGROUND

Conventional control systems present operators with a combination of controls such as switches, buttons, levers, knobs, dials, etc. The operators interact with these control systems by manipulating the presented controls in order to execute various control functions. Recently, control systems have become increasingly complex due to the growing number of controllable features. As control systems increase in complexity, control panels become cluttered with switches, buttons, levers, knobs and/or dials. Accordingly, the control systems become more difficult to operate. In addition, it becomes difficult for engineers to design control panels that are capable of accommodating all of the necessary controls within a confined space.

Track pad devices have been developed to address the problems in the related art. However, these devices are generally two-dimensional (X-Y). For example, some smart phone devices include optical track pads for navigating the graphical user interface (GUI) of the smart phone. The optical track pads have a pleasant tactile feel, provide an audible "tick" for each move and, unlike capacitive touch screens, can be used without direct skin contact. For example, capacitive touch screens do not work with gloves. Some optical track pads do work with gloves; however, because they use a mechanical contact that is separate from the track pad for accept or select functions. Furthermore, optical track pads generally have a fairly low resolution infrared camera susceptible to moisture (sweat) interferences and are limited to measurements in two (X-Y) dimensions.

SUMMARY

Embodiments of the present invention relate to force based track pads for human-machine interfaces (HMI) and in particular track pads capable of sensing forces as well as position and providing tactile and audible feedback.

Described herein is an embodiment of a method of controlling a system using a track pad. The exemplary method comprises a touch interface of a track pad receiving a touch force. The touch interface is positioned over an array of force sensors that are arranged to have a width and a length. The method further comprises passing at least a portion of the touch force through the touch interface to one or more force sensors of the array of force sensors. The one or more force sensors of the array of force sensors transmits the force information to a processor in communication with the array of force sensors. The processor determines from the force information, a force position along the width and length and a corresponding force magnitude. The processor sends a control message to a system, wherein the control message is selected depending upon one or more of the force position along the width and length and the corresponding force magnitude. A feedback generator provides at least one of a tactile or audible feedback to the user of the track pad.

Also described herein is a track pad system that can be used to practice embodiments of the described method. In one aspect, the track pad system comprises a two-dimensional array of force sensors arranged to have a width and a length and a touch interface positioned over the array, wherein the touch interface passes touch forces through to one or more force sensors of the array of force sensors. A processor in communication with a memory executes computer-readable instructions stored on the memory, the instructions cause the processor to receive force information from the array of force sensors; and determine a force position along the width and length and a corresponding force magnitude. The track pad system is further comprised of a feedback generator that generates at least one of a tactile or audible feedback.

A track pad system integrated into a steering mechanism of a vehicle is also described herein. The system comprises a two-dimensional array of force sensors arranged to have a width and a length, the two dimensional array of force sensors embedded into a steering mechanism of a vehicle. The touch interface is positioned over the array, wherein the touch interface passes touch forces through to one or more force sensors of the array of force sensors. The system further comprises a processor in communication with a memory, wherein the processor executes computer-readable instructions stored on the memory, the instructions cause the processor to receive force information from the array of force sensors; determine a force position along the width and length and a corresponding force magnitude; and send a control message to a system, wherein the control message is selected from a plurality of control messages and the system is selected from a plurality of systems depending upon one or more of the force position along the width and length and the corresponding force magnitude.

It should be understood that the above-described subject matter may also be implemented as a computer-controlled apparatus (e.g., a human machine interface for a system), a computing system, or an article of manufacture, such as a computer-readable storage medium.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE SEVERAL VIEWS OF THE DRAWINGS

The components in the drawings are not necessarily to scale relative to each other and like reference numerals designate corresponding parts throughout the several views:

FIG. 4 is an illustration of a table that provides examples of systems that can be selected and control messages that can be sent to the selected system by an application of an embodiment of the present invention.

DETAILED DESCRIPTION

Figure 1:
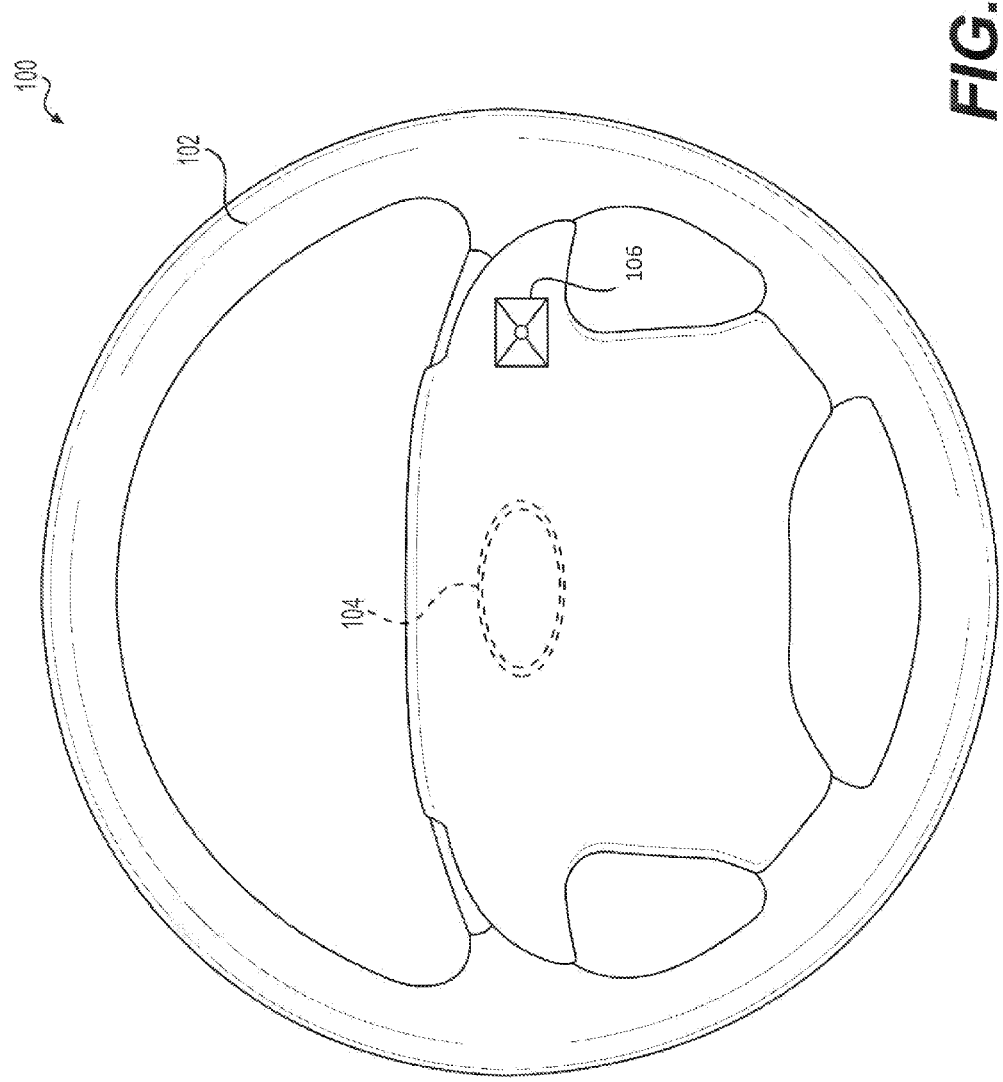
FIG. 1 illustrates a plan view of an exemplary steering apparatus implementing a force-based track pad interface for vehicle control panels in accordance with the present disclosure.

Described herein are embodiments of an invention that include a track pad system for recording multi-dimensional data including an X-Y direction and a force magnitude.

The terminology used herein is for the purpose of describing particular implementations only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The implementation was chosen and described in order to best explain the principles of the invention and the practical application, and to enable others of ordinary skill in the art to understand the invention for various implementations with various modifications as are suited to the particular use contemplated.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to implementations of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 illustrates a plan view of an exemplary steering apparatus implementing a force-based track pad interface for vehicle control panels in accordance with the present disclosure. An example steering apparatus 100 can have a steering grip 102. A steering grip 102 can be shaped in such a way to facilitate a driver's control of a vehicle when holding the steering grip 102. For example, the steering grip 102 can include an annular ring shape with an outer contour that is essentially circular in shape. In an alternate implementation, the steering grip 102 can define any suitable shape including, for example, circular, elliptical, square, rectangular, or any other regular or irregular shape. In an exemplary implementation, the steering grip 102 can include a single continuous grip portion or any number of unique grip sections. Additionally the steering grip 102 can be mounted on a fixed component 104 such that it can be rotationally moved about a steering axis. An exemplary fixed component 104 can include, for example, a steering column, which receives a steering spindle that extends along the steering column and serves to transmit the rotational movement of the steering grip 102 to the wheels of the motor vehicle. Rotational movement of the steering grip 102 may be transmitted to the wheels by mechanical and/or electrical means. In an exemplary implementation, the steering apparatus 100 can also include a force-based track pad sensor 106, wherein the force-based track pad sensor 106 is operably coupled to the steering grip 102.

Coupling a force-based track pad sensor 106 to the steering grip 102 of a steering apparatus 100 provides a driver with a human-machine interface that can be configured to detect a touch or force provided by a user and determine if a switch function should or should not be activated. In one embodiment, the user can be provided with a tactile or audible feedback response.

A force-based track pad sensor 106 can be any sensor configured to change at least one electrical property in response to a touch or force applied to the sensor 106. A touch, also known as a touch event, can be for example a physical contact that occurs when a driver in a vehicle uses their hand (gloved or ungloved) to apply a force to force-based track pad sensor 106. A force-based track pad sensor 106, can be any suitable tactile sensor including, a mechanical sensor, a resistive sensor, a capacitive sensor, a magnetic sensor, an optical fiber sensor, a piezoelectric sensor, a silicon sensor, and/or a temperature sensor.

The force-based track pad sensor 106 can include a two-dimensional array of force sensors arranged to have a width and a length, where each force sensor includes conductors and electrodes and is in at least partial contact with a touch interface positioned over the array. In one embodiment the track pad sensor 106 can further comprise a base that is in at least partial contact with each of the force sensors. In one aspect, the base can comprise a printed circuit board. The touch interface passes touch forces to one or more force sensors of the array of force sensors. The touch interface can embody any touch-sensitive deformable member that can pass at least part of the forces from a user through the touch interface to one or more force sensors of the array of force sensors. In one embodiment, the touch interface can be used to provide haptic feedback to the user.

Figure 2:
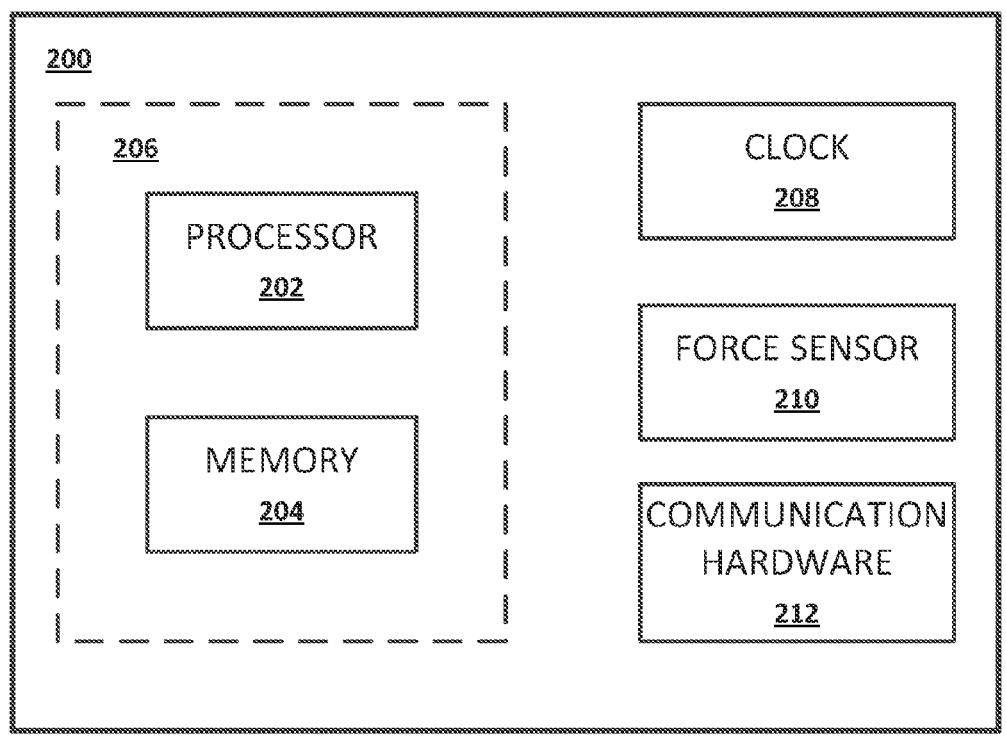
FIG. 2 illustrates a block diagram of a force-based track pad sensor system according to an implementation of the invention.

Referring to FIG. 2, a block diagram of a force-based track pad sensor system 200 according to an implementation of the invention is shown. The sensor system 200 is an example of a human machine interface for controlling a system as discussed in further detail below. The sensor system 200 may be used to sense a position and magnitude of force applied to the sensor system 200. In other words, the sensor system 200 may be configured to sense the position of the applied force in either one dimension (e.g., the X- or Y-direction) or two dimensions (e.g., the X- and Y-directions), as well of as the magnitude of the applied force (e.g., force in the Z-direction). The sensor system 200 can also be configured to sense the time that a force is applied at a particular location. The sensor system 200 may include a computing unit 206, a system clock 208, one or more force sensors 210 and communication hardware 212. In its most basic form, the computing unit 206 may include a processor 202 and a system memory 204. The processor 202 may be a standard programmable processor that performs arithmetic and logic operations necessary for operation of the sensor system 200. The processor 202 may be configured to execute program code encoded in tangible, computer-readable media. For example, the processor 202 may execute program code stored in the system memory 204, which may be volatile or non-volatile memory. The system memory 204 is only one example of tangible, computer-readable media. In one aspect, the computing unit 206 can be considered an integrated device such as firmware. Other examples of tangible, computer-readable media include floppy disks, CD-ROMs, DVDs, hard drives, flash memory, or any other machine-readable storage media, wherein when the program code is loaded into and executed by a machine, such as the processor 202, the machine becomes an apparatus for practicing the disclosed subject matter.

In addition, the sensor system 200 may include one or more force sensors 210 that can change at least one electrical property (e.g., resistance) in response to forces applied to the sensor system 200. The force sensor 210 is an example of a pressure sensitive input device as discussed in further detail below. Further, the sensor system 200 may include communication hardware 212 that interfaces with the force sensor 210 and receives/measures the sensed changes in the at least one electrical property of the force sensor 210. Additionally, the sensor system 200 may include a system clock 208. The processor 202 may be configured to associate the sensed changes in the at least one electrical property of the force sensor 210 with a time from the system clock 208 and store the sensed changes and corresponding time to the system memory 204. Optionally, the processor 202 may be configured to analyze the stored data and associate measured changes in the at least one electrical property of the force sensor 210 with various control messages for controlling system functions.

Figure 3A:
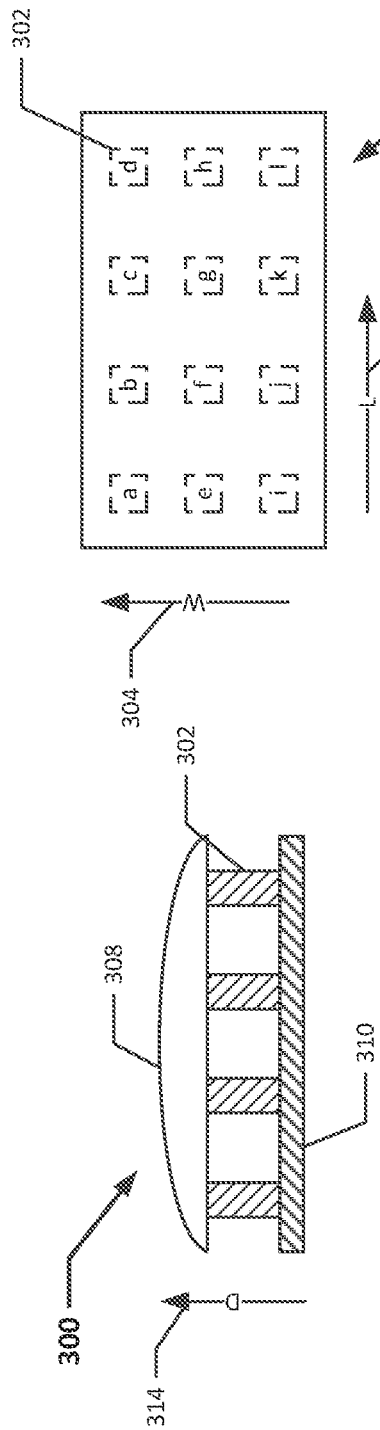
FIGS. 3A and 3B illustrate a cross-sectional view and a plan view of an embodiment of a force-based track pad.
Figure 3B:
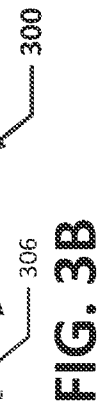

FIGS. 3A and 3B illustrate a cross-sectional view and a plan view of an embodiment of a force-based track pad 300. This embodiment of a force-based track pad 300 includes a two-dimensional array of force sensors 302 arranged to have a geometric shape having a width 304 and a length 306. For example, the array of force sensors 302 may have a width 304 or length 306 that is 8 mm or larger. In another example, the array of force sensors 302 may have a width 304 or length 306 that is less than 8 mm. In one embodiment, the track pad 300 can have a depth 314 that is 0.5 mm or less. In another example, the track pad 300 can have a depth 314 that is greater than 0.5 mm. While shown in FIGS. 3A and 3B as having a rectangular shape, it is to be appreciated that this is for illustrative purposes only and the two-dimensional array of force sensors 302 can have shapes such as circular, oval, square, rectangular, triangular and irregular shapes. Further comprising the embodiment of a force-based track pad 300 as shown in FIGS. 3A and 3B is a touch interface 308 positioned over the array of force sensors 302, wherein the touch interface 308 passes touch forces through to one or more force sensors 302 of the array of force sensors 302. As described herein, the touch interface 308 can embody any touch-sensitive deformable member that can pass at least part of the forces from a user through the touch interface 308 to one or more force sensors 302 of the array of force sensors 302. For example, the touch interface 308 can be comprised of rubber, plastics, flexible metals, leather, and the like including combinations thereof. Generally, the force sensors 302 are connected to or integrated with a base 310. For example, the base 310 can comprise a printed circuit board (PCB) used to electronically communicate information or power to and from the force sensors 302 in the form of electrical signals. In various embodiments, the base 310 can further comprise electronic circuit components such as resistors, capacitors, diodes, LEDs, transmitters, receivers, and the like. In one embodiment, the base 310 is used to electrically connect the force sensors 302 with a processor 202, as described herein.

The force sensors 302 are arranged such that the position of a force on the touch interface 308 can be detected by one or more of the force sensors 302 of the array of force sensors 302. In this manner, by the force sensors 302 affected by the force on the touch interface 308 and the magnitude of the force on each of the affected force sensors 302, the position (X, Y) of the force on the touch interface 308 can be determined. For example, force information from the array of force sensors can be transmitted to a processor such as the processor 202 shown in FIG. 2 and described herein. The processor 202 can be in communication with a memory 204, wherein the processor 202 executes computer-readable instructions stored on the memory 204. The instructions can cause the processor 202 to receive the force information from the array of force sensors 302 and determine a force position along the width 304 and length 306 and a corresponding force magnitude. The force information can be transmitted from the array of force sensors 302 to the processor 202 via a wired connection (including fiber optics, wirelessly (RF using protocols such as Bluetooth™, WiFi (IEEE 802.11n), etc.), or combinations thereof. For example, referring now to FIG. 3B, the processor can receive force information from force sensors c, d, g, and h. By having the location of these force sensors 302 programmed into its memory 204, the processor 202 can determine that a force is being applied to the upper right-hand quadrant of the force-based track pad 300. By determining the magnitude of the force being applied to the force sensors 302, the processor 202 can be programmed via instructions from the memory 204 to further refine the location of the force and to take specific actions based on any of the location of the force on the track pad 300, the magnitude of the force applied to the track pad 300, the time the force is applied to the track pad 300, the change of the location of the applied force to the track pad 300, the rate of the change of the location of the applied force to the track pad 300 (e.g., quickly swiping a thumb across the track pad 300 results in one action being taken while slowly swiping the thumb across the track pad 300 results in a different action being taken), the direction of the change of the location of the applied force to the track pad 300, the length from a first touch point to a second touch point on the track pad 300, the length or distance that a digit is moved across the track pad 300 after a first touch point, the direction that a digit is moved across the track pad 300 after a first touch point, changes in the magnitude of the force applied to the track pad 300, rate of change in the magnitude of the force applied to the track pad 300, combinations of any of the above, and the like.

Referring back to FIG. 3A, the force sensors 302 can be any device or structure that can transform force into a signal. The signal can be electrical, electronic (digital or analog), mechanical, or optical. For example, in one embodiment the force sensors are microelectromechanical systems (MEMS) sensors. In one embodiment, the MEMS sensors are structure-based piezo-resistive sensors.

Figure 3C:
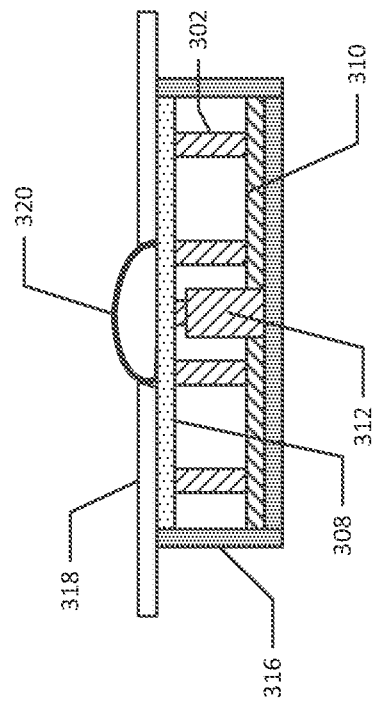
FIG. 3C illustrates another embodiment of a force-based track pad that further comprises a feedback generator that generates at least one of a tactile or audible feedback.

FIG. 3C illustrates another embodiment of a force-based track pad 300 that further comprises a feedback generator 312 that generates at least one of a tactile or audible feedback. In one aspect, the tactile or audible feedback provided by the feedback generator 312 is proportional to at least one of the force position and the force magnitude. For example, the tactile or audible feedback can get stronger or louder as greater force is applied to the track pad 300. Similarly, the tactile or audible feedback can get stronger or louder depending upon the location on the track pad 300 where the force is applied. The feedback generator 312 may, in some embodiments, be controlled by the processor 202. For example, the processor 202 may determine the location or magnitude of the force applied to the track pad 300, as described herein, and then cause the feedback generator 312 to generate the tactile or audible feedback that is proportional to at least one of the force position and the force magnitude. Software stored in the memory 204 can cause the processor 202 to perform these functions. In one embodiment, the feedback generator 312 can be integrated into the structure that comprises the force-based track pad 300. For example, in one embodiment the feedback generator 312 can be integrated into the base 310. In another embodiment, the feedback generator 312 is a structural part of the structure-based piezo-resistive sensors, as described herein. In yet another embodiment, the feedback generator 312 is a haptic generator used to generate the tactile and audible feedback. In one embodiment, the haptic generator can be a coneless coil and magnet assembly such as that described in U.S. Pat. App. Pub. No. 2012/0039494 entitled "LOUDSPEAKERS" and filed on Feb. 16, 2010, which is fully incorporated herein by reference and made a part hereof.

The embodiments of a force-based track pad 300 described herein can be used to control one or more systems. For example, embodiments of a force-based track pad 300 described herein can be used to control the systems of a vehicle such as environmental (HVAC), audio, telephone, cruise control, windshield wipers, lighting, window and mirrors, and the like. For example, instructions stored in the memory 204 can further cause the processor 202 to send a control message to a system selected from a plurality of systems, wherein the control message is selected from a plurality of control messages by the processor 202. The selection of system and control message can be made depending upon one or more of the force position along the width and length and the corresponding force magnitude. For example, in one embodiment the system can be selected from the plurality of systems depending upon the force magnitude and the control message is selected from the plurality of control messages depending at least partially upon the force position along the width and length. Consider this example, the force-based track pad 300 can have a plurality of force thresholds that can be used to select the system from the plurality of systems. For example, the force-based track pad 300 can have at least three thresholds that correlate to a different system for each threshold. In one example, the force thresholds are in increments of one Newton (N) or one ounce, two N or two ounces, and the like. For example, the first threshold may be at a force of one Newton (N) or one ounce and correlate to the audio system of a vehicle. The second threshold can be at two N or two ounces of force that correlates to the HVAC system for the vehicle. The third threshold can be at three N or three ounces of force that correlates to the cruise control system for the vehicle. In other words, the track pad 300 can recognize force magnitude of at least three thresholds and the system is selected from the plurality of systems depending upon the force magnitude exceeding one or more of the thresholds.

In one embodiment, once the system is selected from the plurality of systems based on the force magnitude, a control message for sending to that selected system can be selected from a plurality of control messages based at least in part on the force position along the width and length of the track pad 300. For example, if the HVAC system is selected based on the force magnitude, then a control message such as turn on/off the heat, turn up/down the fan, adjust the temperature, etc., can be selected based at least in part on the force position along the width and length of the track pad 300. For example, control messages to send to the selected system can be selected based on one or more of the time the force is applied to the track pad 300 at a certain location, the change of the location of the applied force to the track pad 300, the rate of the change of the location of the applied force to the track pad 300 (e.g., quickly swiping a thumb across the track pad results in one action being taken while slowly swiping the thumb across the track pad 300 results in a different action being taken), the direction of the change of the location of the applied force to the track pad 300, the length from a first touch point to a second touch point on the track pad 300, the length or distance that a digit is moved across the track pad 300 after a first touch point, the direction that a digit is moved across the track pad 300 after a first touch point, changes in the magnitude of the force applied to the track pad 300, changes in the magnitude of the force applied to the track pad 300, rate of change in the magnitude of the force applied to the track pad 300, combinations of any of the above, and the like.

In one embodiment, the feedback generator 312 can provide an audible tick or other sound when the control message is selected from the plurality of control messages depending at least partially upon the force position along the width and length and provide the tactile feedback for each selection made depending on the force magnitude. Alternatively, the feedback generator 312 can provide an audible tick for each selection made depending on the force magnitude and provide tactile feedback when the control message is selected from the plurality of control messages depending at least partially upon the force position along the width and length of the track pad 300.

Figure 3D:
FIG. 3D is an illustration of a cross-sectional view of yet another embodiment of a force-based track pad.

FIG. 3D is a cross-sectional view of yet another embodiment of a force-based track pad 300. This embodiment includes the two-dimensional array of force sensors 302 arranged to have a geometric shape having a width 304 and a length 306, a touch interface 308 positioned over the array of force sensors 302, wherein the touch interface 308 passes touch forces through to one or more force sensors 302 of the array of force sensors 302, a base 310, and a feedback generator 312 that generates at least one of a tactile or audible feedback. Further comprising the embodiment shown in FIG. 3D is an enclosure 316 that encloses the components of the track pad 300. The enclosure 316 can be comprised of any suitable material such as plastics, metals, and the like. It can be used to add structural integrity to the track pad 300 as well as to protect it from physical and/or environmental damage or contamination. The enclosure 316 may also facilitate manufacturing, installation or removal of the track pad 300. Further illustrated in FIG. 3D is an interchangeable overlay 320 so that different materials, colors, textures can be used for the track pad 300, which can be used for an aesthetic effect of a larger device, such as a vehicle, where the track pad 300 is installed. This can also allow replacement of the overlay 320 if it becomes damaged, dirty or worn. Also shown in FIG. 3D, but not required, is the trim 318 of a larger device, such as a vehicle, where the track pad 300 is installed. For example, the trim 318 can be a part of the steering apparatus 100 shown in FIG. 1.

As noted herein, the force-based track pad can be used to select and control a plurality of systems. The table 400 of FIG. 4 illustrates examples of systems that can be selected and control messages that can be sent to the selected system. For example, the force-based track pad 300 can have a plurality of thresholds that correlate to a different system for each threshold. In one example application of an embodiment of the invention, as shown in the table 400 of FIG. 4, the first threshold may correlate with the HVAC system for a vehicle. By selecting the first threshold by applying a defined amount of force (e.g., one N or one ounce) to the track pad 300 (either momentarily or for a defined period of time), the HVAC system can be selected and controlled using the track pad 300. Once selected by the force applied to the track pad 300, the track pad 300 can be used to select and send control messages to the HVAC system. Gestures or other actions using the track pad 300 that are at least partially dependent upon the position along the width and length of the track pad 300 can be used to send the control messages to the HVAC system. For example, control messages to send to the selected system can be selected based on one or more of the time the force is applied to the track pad 300 at a certain location, the change of the location of the applied force to the track pad 300, the rate of the change of the location of the applied force to the track pad 300 (e.g., quickly swiping a thumb across the track pad results in one action being taken while slowly swiping the thumb across the track pad 300 results in a different action being taken), the direction of the change of the location of the applied force to the track pad 300, the length from a first touch point to a second touch point on the track pad 300, the length or distance that a digit is moved across the track pad 300 after a first touch point, the direction that a digit is moved across the track pad 300 after a first touch point, changes in the magnitude of the force applied to the track pad 300, changes in the magnitude of the force applied to the track pad 300, rate of change in the magnitude of the force applied to the track pad 300, combinations of any of the above, and the like. For the exemplary HVAC system that has been selected, such control messages can include for example: Turn on/off; Adjust temperature; Adjust fan speed; Adjust mode (e.g., defrost, face and feet, just feet, etc.); Adjust seat heat/ventilation; and the like.

Similarly, a second force threshold can be correlated with a second system, such as an audio system of a vehicle. In one embodiment, the second threshold is at a force greater than the first threshold. In another embodiment, the second threshold can be at a force less than the first threshold. Similar to the above, once the audio system is selected using force on the track pad 300, control messages can be sent to the audio system using gestures or other actions using the track pad 300 that are at least partially dependent upon the position along the width and length of the track pad 300. For the audio system such messages can be, for example: Turn on/off; Adjust sound level; Adjust fade, balance, bass, treble, etc.; Adjust mode (e.g., radio, satellite radio, CD, auxiliary, etc.); and the like. Other systems, such as those shown in FIG. 4, can be selected and controlled in similar fashion.

The track pad system 300 disclosed herein may be particularly applicable to distracted environments, such as in automobile operation, wherein the human needs additional feedback to properly operate a machine. For example, the driver of an automobile is usually best visually focused on his or her surroundings during the driving task. The ability of the track pad system 300 to provide haptic and audible feedback makes for more sure and satisfying operation of various automobile systems. As described herein, the track pad system 300 may be used, for example, to operate stereo and/or climate controls. Each change of a station or degree could generate haptic and audible feedback. In addition, the provision of force sensitivity—and in particular thresholds—allows multiple layers of functionality from a single button. The advantage of this implementation is that the track pad 300 can replace a large number of controls and shrink the necessary reach range (and the amount of distraction) for the driver.

Figure 5:
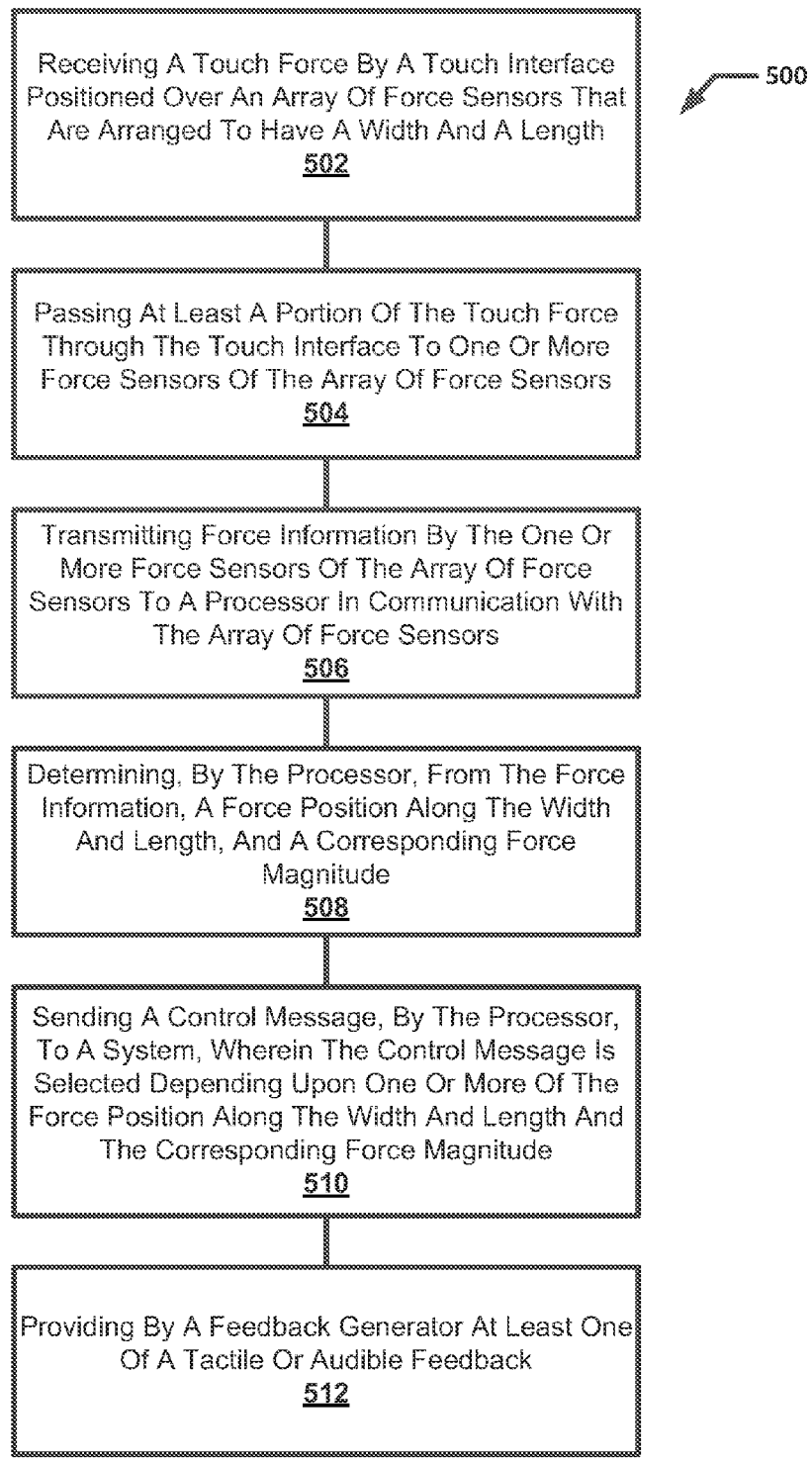
FIG. 5 is an exemplary flowchart that can be used to describe a method of controlling a system using a track pad.

FIG. 5 is an exemplary flowchart 500 that can be used to describe a method of controlling a system using a track pad. Steps of the method comprise Step 502, receiving a touch force by a touch interface 308 positioned over an array of force sensors 302 that are arranged to have a width 304 and a length 306. At Step 504, passing at least a portion of the touch force through the touch interface 308 to one or more force sensors 302 of the array of force sensors 302. At Step 506, transmitting force information by the one or more force sensors 302 of the array of force sensors 302, to a processor 202 in communication with the array of force sensors 302. At Step 508, determining, by the processor, from the force information, a force position along the width 304 and length 306, and a corresponding force magnitude. At Step 510, the processor sends a control message to a system, wherein the control message is selected depending upon one or more of the force position along the width 304 and length 306 and the corresponding force magnitude. In one aspect, as described herein, sending the control message to the system, wherein the control message is selected depending upon one or more of the force position along the width and length and the corresponding force magnitude, further comprises selecting the system from a plurality of systems and selecting the control message from a plurality of control messages, the selections made depending upon one or more of the force position along the width and length and the corresponding force magnitude. In one embodiment, the system is selected from the plurality of systems depending upon the force magnitude and the control message is selected from the plurality of control messages depending at least partially upon the force position along the width and length. For example, the force magnitude can have at least three thresholds and the system is selected from the plurality of systems depending upon the force magnitude exceeding one or more of the thresholds. In one aspect, a different system is selected for each threshold. In another embodiment, the control message is selected depending upon the force magnitude exceeding a threshold, wherein the force magnitude has at least three thresholds and the control message is selected depending upon the force magnitude exceeding one or more of the thresholds. In one aspect, a different control message is selected for each threshold. At Step 512, a feedback generator provides at least one of a tactile or audible feedback. In one aspect, the feedback generator provides a tactile or audible feedback that is proportional to at least one of the force position and the force magnitude. For example, the feedback may get louder, more frequent, more powerful, quieter, less powerful, etc. depending upon the force applied to the track pad 300 or at least partially upon the force position. In one embodiment, the feedback generator can be configured to provide an audible tick or other sound when the control message is selected from the plurality of control messages depending at least partially upon the force position along the width and length and provide the tactile feedback for each selection made depending on the force magnitude.

The flowchart and block diagrams in the figures illustrate the architecture, functionality, and operation of possible implementations of systems, methods and computer program products according to various implementations of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The implementation was chosen and described in order to best explain the principles of the invention and the practical application, and to enable others of ordinary skill in the art to understand the invention for various implementations with various modifications as are suited to the particular use contemplated.

What is claimed:

1. A method of selecting and controlling a system using a track pad that is not connected to any display device, the track pad comprising:
    receiving, by a touch interface positioned over an array of force sensors that are arranged to have a width and a length, a touch force, wherein said touch interface is integrated into a steering mechanism of a vehicle;
    passing at least a portion of said touch force through the touch interface to one or more force sensors of the array of force sensors;
    transmitting, by the one or more force sensors of the array of force sensors, force information to a processor in communication with the array of force sensors;
    determining, by the processor, from the force information a force position along the width and length and a corresponding force magnitude; and
    sending, by the processor, a control message to a system, wherein the control message is selected from among a plurality of control messages depending upon the force position along the width and length and the system is selected from among a plurality of systems based on the corresponding force magnitude, wherein the force magnitude has at least two thresholds and a first system is selected from the plurality of systems when the force magnitude exceeds a first threshold of the at least two thresholds and a second system is selected from the plurality of systems when the force magnitude exceeds a second threshold of the at least two thresholds.

2. The method of claim 1, further comprising providing, by a feedback generator, at least one of a tactile or audible feedback.

3. The method of claim 2, wherein providing, by the feedback generator, at least one of a tactile or audible feedback, comprises the feedback generator providing tactile or audible feedback that is proportional to at least one of the force position and the force magnitude.

4. The method of claim 2, wherein providing the at least one of a tactile or audible feedback by the feedback generator comprises providing the tactile or audible feedback by a haptic generator that generates the at least one of a tactile or audible feedback.

5. The method of claim 4, wherein the haptic generator is a coneless coil and magnet assembly.

6. The method of claim 1, wherein the first system and the second system each comprise a different system of the plurality of systems.

7. The method of claim 1, further comprising providing, by a feedback generator, at least one of a tactile or audible feedback, wherein the feedback generator is configured to provide an audible tick when the control message is selected from the plurality of control messages depending at least partially upon the force position along the width and length and provide the tactile feedback for each selection made depending on the force magnitude.

8. The method of claim 1, wherein sending, by the processor, the control message to the system, wherein the control message is selected depending upon one or more of the force position along the width and length and the corresponding force magnitude comprises selecting the control message depending upon the force magnitude exceeding a threshold.

9. The method of claim 8, wherein the force magnitude has at least two thresholds and the control message is selected depending upon the force magnitude exceeding one or more of the thresholds.

10. The method of claim 9, wherein a different control message is selected for each threshold.

11. The method of claim 1, wherein receiving, by the touch interface positioned over the array of force sensors arranged to have a width and a length, the touch force comprises receiving the touch force by the touch interface positioned over an array of MEMS sensors.

12. The method of claim 11, wherein the MEMS sensors are structure-based piezo-resistive sensors.

13. The method of claim 12, further comprising providing, by a feedback generator, at least one of a tactile or audible feedback, wherein providing the at least one of a tactile or audible feedback by the feedback generator comprises providing the tactile or audible feedback by a feedback generator that is a structural part of the structure-based piezo-resistive sensors.

14. A track pad system for selecting and controlling a system using a track pad that is not connected to any display device, the track pad comprising:
a two-dimensional array of force sensors arranged to have a width and a length;
a touch interface positioned over the array, wherein the touch interface passes touch forces through to one or more force sensors of the array of force sensors and said touch interface is integrated into a steering mechanism of a vehicle;
a processor in communication with a memory, wherein the processor executes computer-readable instructions stored on the memory, said instructions cause the processor to:
receive force information from the array of force sensors; and
determine a force position along the width and length and a corresponding force magnitude;
provide, by a feedback generator, at least one of a tactile or audible feedback; and
send a control message to a system selected from a plurality of systems and wherein the control message is selected from among a plurality of control messages by the processor depending upon the force position along the width and length and the system is selected from among a plurality of systems based on the corresponding force magnitude, wherein the force magnitude has at least two thresholds and a first system is selected from the plurality of systems when the force magnitude exceeds a first threshold of the at least two thresholds and a second system is selected from the plurality of systems when the force magnitude exceeds a second threshold of the at least two thresholds.

15. The track pad system of claim 14, wherein the tactile or audible feedback provided by the feedback generator is proportional to at least one of the force position and the force magnitude.

16. The track pad system of claim 14, wherein the force sensors are MEMS sensors.

17. The track pad system of claim 16, wherein the MEMS sensors are structure-based piezo-resistive sensors.

18. The track pad system of claim 17, wherein the feedback generator is a structural part of the structure-based piezo-resistive sensors.

19. The track pad system of claim 14, wherein the feedback generator comprises a haptic generator.

20. The track pad system of claim 19, wherein the haptic generator is a coneless coil and magnet assembly.

21. The track pad system of claim 14, wherein the force magnitude has at least three thresholds and the first system is selected from the plurality of systems depending upon the force magnitude exceeding the first threshold of the at least two thresholds the second system is selected from the plurality of systems when the force magnitude exceeds the second threshold of the at least two thresholds, and a third system is selected from the plurality of systems when the force magnitude exceeds a third threshold of the at least two thresholds.

22. The track pad system of claim 21, wherein the at least three thresholds are in increments of 1 N or 1 ounce.

23. The track pad system of claim 14, wherein the feedback generator is configured to provide an audible tick when the control message is selected from the plurality of control messages depending at least partially upon the force position along the width and length and provide the tactile feedback for each selection made depending on the force magnitude.

24. The track pad system of claim 14, wherein the width or length is 8 mm or larger.

25. The track pad system of claim 14, having a 0.5 mm or less thickness.

26. A track pad system integrated into a steering mechanism of a vehicle for selecting and controlling a vehicle system using a track pad that is not connected to any display device, the track pad comprising:
a two-dimensional array of force sensors arranged to have a width and a length, the two-dimensional array of force sensors embedded into a steering mechanism of a vehicle;
a touch interface positioned over the array, wherein the touch interface passes touch forces through to one or more force sensors of the array of force sensors;

a processor in communication with a memory, wherein the processor executes computer-readable instructions stored on the memory, said instructions cause the processor to:

receive force information from the array of force sensors;

determine a force position along the width and length and a corresponding force magnitude; and send a control message to a system, wherein the control message is selected from among a plurality of control messages by the processor depending upon the force position along the width and length and the system is selected from among a plurality of systems depending upon the corresponding force magnitude, wherein the force magnitude has at least two thresholds and a first system is selected from the plurality of systems when the force magnitude exceeds a first threshold of the at least two thresholds and a second system is selected from the plurality of systems when the force magnitude exceeds a second threshold of the at least two thresholds.

27. The system of claim 26 further comprising a feedback generator, wherein the feedback generator is controlled by the processor and the processor causes the feedback generator to generate at least one of a tactile or audible feedback.

* * * * *